May 28, 1940.  E. E. LANDAHL  2,202,497
OVERLOAD RELEASE MECHANISM
Filed March 8, 1938  2 Sheets-Sheet 2
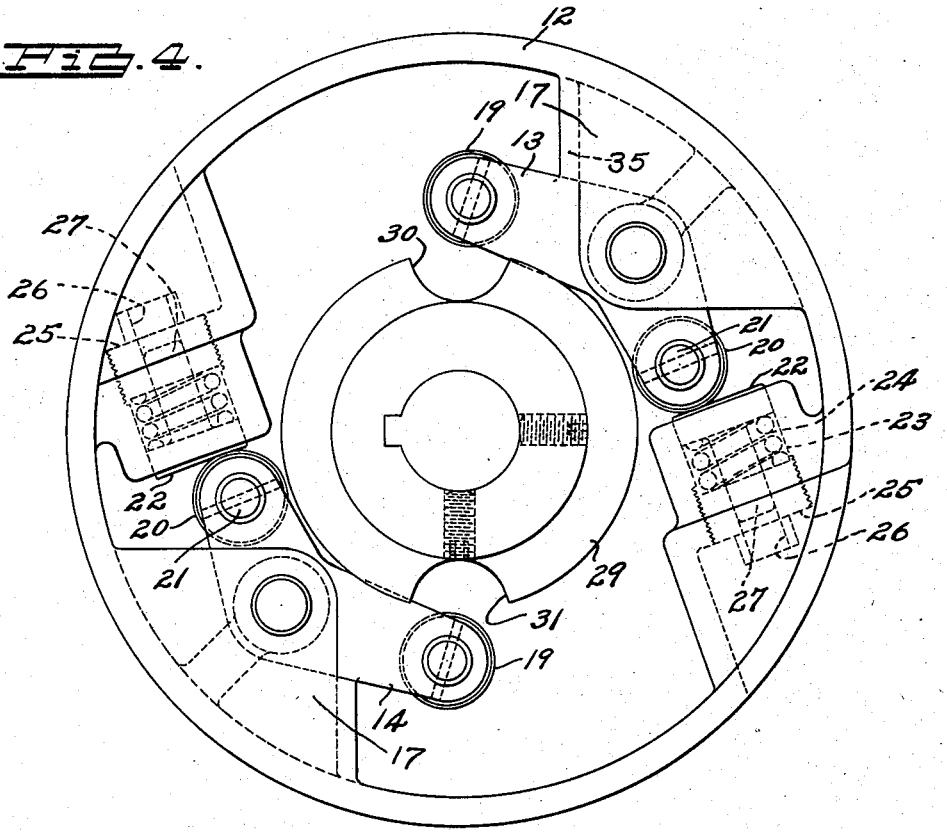
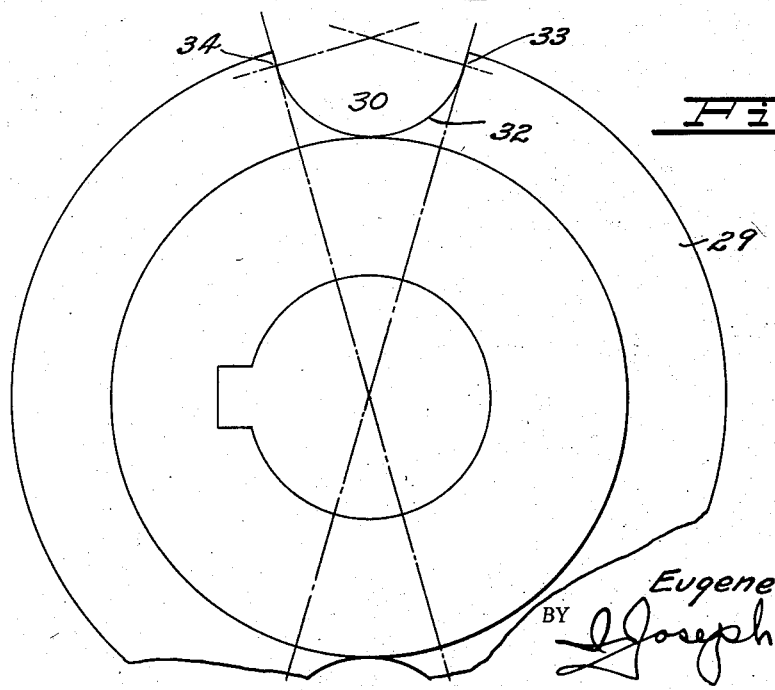
INVENTOR.
Eugene E. Landahl
BY Joseph Farley
ATTORNEY.

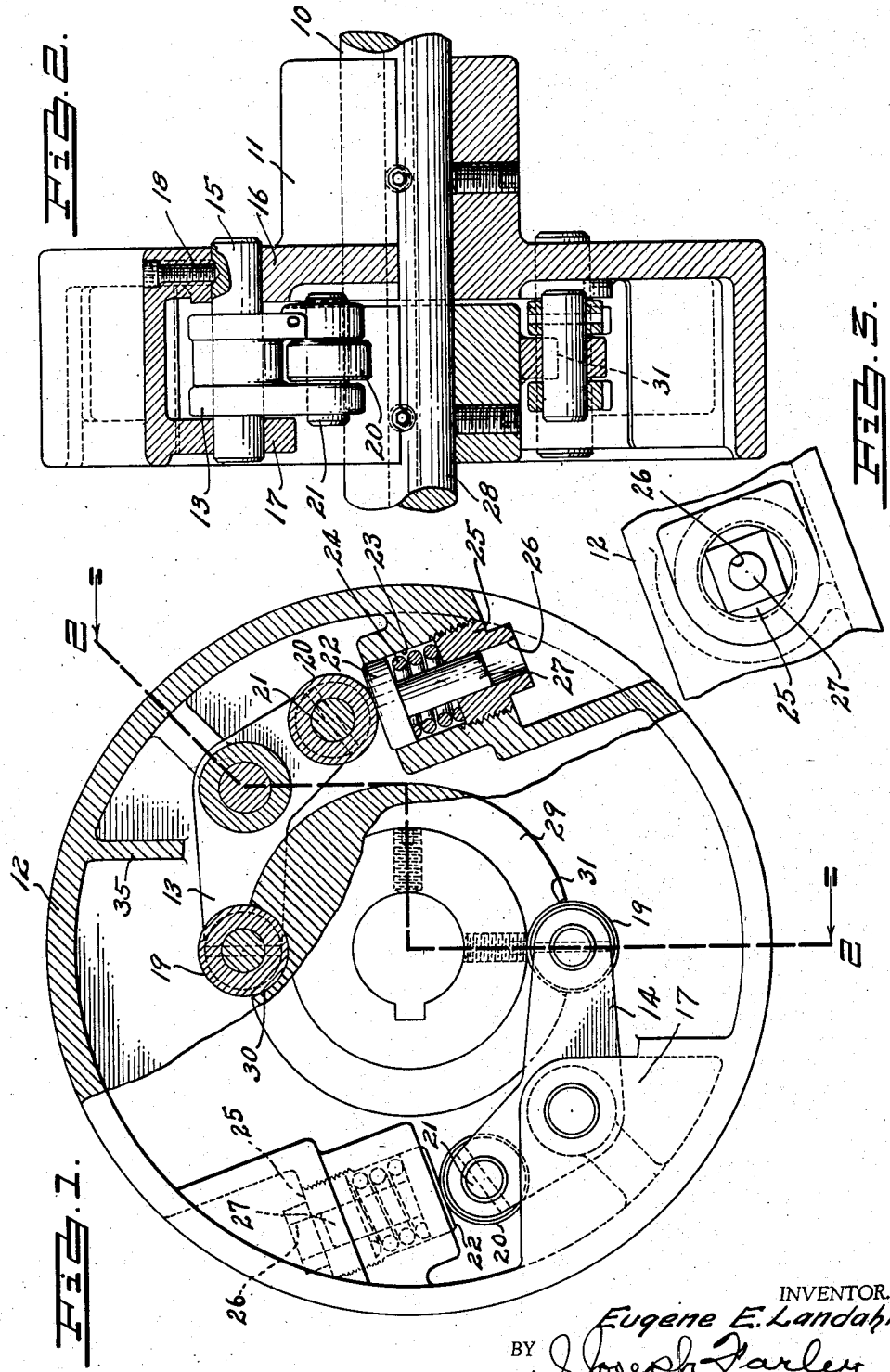

Patented May 28, 1940

2,202,497

UNITED STATES PATENT OFFICE 2,202,497

OVERLOAD RELEASE MECHANISM

Eugene E. Landahl, Detroit, Mich., assignor to Palmer-Bee Company, Detroit, Mich., a corporation of Michigan Application March 8, 1938, Serial No. 194,639

3 Claims. (Cl. 192—56)

This invention relates to overload release units for disconnecting a rotating driving member from a driven member when the torque transmitted exceeds a certain predetermined amount, thereby preventing overload and possible breakage of other parts of the power transmitting system.

It has long been common practice in mechanical constructions to so design a power transmitting unit that one easily replaceable and inexpensive part would be selected and designed as the weakest point in the system and would therefore be the first part to break when an overload in excess of a predetermined maximum was thrown onto the system. In carefully designed units this part could be so proportioned and positioned as to break at a predetermined load well under the safe load for other parts of the system and therefore afford protection for the more important and expensive parts. A most common form of construction used for the above outlined purpose is the so-called shear pin which is easily designed to break at a predetermined torque on any given shaft by consideration of its radial position, its material and its size. Although a properly designed pin or other fastening adequately serves the purpose of an overload release in many installations, such a construction requires that the entire unit be out of operation for a considerable time while the broken part is replaced. In units where an overload is likely to occur frequently, as in conveyor installations, the necessary interruption of service to replace shear pins or other fastenings makes such a construction impractical. Another disadvantage in using a part designed to break at a given load is that there is no adjustment available to quickly change the load at which a break will occur. Such an adjustment is considered advantageous since the unit is rendered adaptable to changing conditions quite generally existing, particularly in conveyor installations.

It is, of course, possible to provide a special mechanism to effect release, but any such separate overload release mechanism to be practical over the original method of using the relative strength of the parts should be of simple and inexpensive design; must be capable of being quickly reset without the use of special tools; and furthermore, to be most useful should be capable of adjustment over a reasonable range of release loads.

It is therefore a primary object of the present invention to provide an overload release mechanism which can easily and quickly be reset after it has performed its function of releasing at a predetermined load.

It is a further object to provide an overload release which is easily and quickly adjusted to various release loads.

It is another object to provide an overload release mechanism which is held in driving engagement by a resilient means until released at a predetermined maximum torque, and after release the said resilient means becomes effective to hold said mechanism out of driving engagement until manually reset.

It is a further object to provide an overload release of such construction as to be easily adapted to various installations and which will occupy a minimum of space.

It is another object to provide an overload release mechanism for connecting rotating driving and driven members by the use of sockets on one of said members and rollers mounted on the other of said members with resilient means to hold said rollers and said sockets in engagement thereby to effect a driving connection dependent on the force exerted by said resilient means.

The above and other objects of the invention will appear more fully from the following more detailed description and by reference to the accompanying drawings forming a part hereof and wherein:

Fig. 1 is a side elevation, partly in section, showing the several major parts of the overload release mechanism in position for transmitting load.

Fig. 2 is a section taken on the line 2—2 of Fig. 1 showing the driving and driven shafts and connecting parts.

Fig. 3 is a view showing the mechanism for adjusting the compression of the actuating spring to vary the release load.

Fig. 4 is a side elevation of the device with the parts in the position they occupy after release.

Fig. 5 is an enlarged view showing in detail the shape of the sockets for retaining the ends of the release lever.

Referring to the drawings, particularly to Figs. 1 and 2, there is shown a shaft 10 to which is secured a casting 11, a housing portion 12 of which is provided with suitable supporting bosses for pivotally mounting a plurality of levers, there being two levers 13 and 14 shown in the particular design selected for illustration. The manner of mounting the two levers 13 and 14 on the housing 12 is similar, and is shown by the sectional views in Figs. 1 and 2 wherein it appears that a pin 15 pivots each lever to the housing with the ends of said pin supported in aligned holes, one end in a boss 16 on the inner surface of housing 12, and the other end in a lug 17 which projects inwardly from the outer portion of the housing 12, as shown in Figs. 1, 2 and 4. The end construction of the levers 13 and 14 provides for rollers on each end thereof, as indicated by rollers 19 and 20 shown on the ends of the lever 13. As shown in Fig. 2, the construction herein disclosed makes use of a lever having forked ends with a pin 21 extending through suitable drilled openings to mount the roller for rotation.

As shown in Fig. 1, the right hand end of the lever 13 is so positioned as to enable the roller 20 to contact a spring retained piston member 22 which is mounted in a drilled opening provided in the inner side of the housing 12. A spring 24 is held in place by threaded plug 25 having an opening 26 in which the projection 27 of the piston member 22 is free to reciprocate.

A second main power shaft 28 in alignment with shaft 10 has mounted thereon a spider 29 of generally circular shape which is provided with sockets of such shape as to surround approximately one-half the circumference of the roller ends on each of the levers 13 and 14. One of these sockets is shown at 30 in Fig. 1 with the roller 19 of the lever 13 positioned therein. Another socket 31 is also shown in Fig. 1 and retains the roller end of the lever 14. A detailed view of the shape of the socket 30 is shown in Fig. 5, the socket 31 being similar in shape to the socket 30. It is noted that the sockets have an arcuate portion 32 with its center of curvature substantially in line with the outer circumference of the spider. However, as shown in Fig. 5 the arcuate portion terminates inside the circumferential line of the spider and the walls of the socket 30 continue in a straight tangential line shown at 33 and 34 in Fig. 5.

In the operation of the device the unit as shown in Fig. 1 is set to transmit power from the shaft 10 to the shaft 28, or vice versa, by springing the levers 13 and 14 so that the end rollers thereof, as indicated at 19 in Fig. 1, slip into the sockets 30 and 31. It is noted that the angle of each of the levers and the position of its pivot relative to the position of the corresponding piston member 22 is such that when the levers are in the position shown in Fig. 1 the direction of the force exerted on the end rollers 20 is such that the rollers are held in their sockets by the action of the springs 24 against the piston members 22. It is apparent on inspection of Figs. 1 and 2 that the levers 13 and 14 with their rollers retained in the sockets 30 and 31 by the action of the springs 24 effect a connection between the shafts 10 and 28. Furthermore, the relative positions of the pivot 15, the roller 20 and the spring urged piston 22 are such that when the mechanism is set to transmit load, as shown in Fig. 1, the direction of the force exerted against the roller 20 is offset a material distance from the center of the pivot 15, thereby holding the roller 19 in the socket 30, as will be evident on inspection of Fig. 1. Considering the spider 29 as the driving member and assuming that rotation is clockwise, as shown in Fig. 1, there will be a transmission of force between the spider 29 and the housing 12 through the connection effected by the two rollers held in engagement in the sockets 30 and 31. However, since less than half the circumference of the rollers is surrounded by the sockets and since the center of the rollers is above the resultant force exerted by the spider upon the rollers, there will always be a tendency for the rollers to roll out of the sockets. Furthermore, because of the construction of the sockets with the tangential end walls 33 and 34, as shown in Fig. 5, the rollers on slight rolling movement toward disengagement will roll upon a relatively short section of end wall and if the spring pressure exerted through the leverage provided is sufficient to overcome the torque exerted, the rollers will remain in engagement with the sockets. However, when the torque becomes so great as to overcome the force exerted by the springs through the leverage the rollers will roll so far as to come to the edge of the sockets and roll out therefrom to effect disengagement of the mechanism. It is especially to be noted that the use of the flat tangential end walls makes possible more satisfactory operation of the device since there is a slight rolling movement allowed before actual disengagement occurs, during which time the force exerted on the lever 13 by the spring 24 is opposed by a component of the force which is normal to the flat end wall. Since the driving engagement is thus effected by contact of a roller on a flat surface the forces are transmitted in a well defined manner and therefore the torque at which release will occur can be most accurately controlled. Furthermore, by the use of the adjustment provided by the plugs 25 it is possible to vary the force exerted by the springs thereby to vary the maximum torque which may be transmitted through the device. In this connection it is important to note that the roller 20 contacts the end of the piston 22 in such manner that a very small movement of the piston 22 is required to move the lever from a load transmitting to a release position. Also that the position of the parts is such that when the release is effected the roller 21 rolls on the top of the piston 22 to a position almost under the pivot 15 and by the provision of a stop 35 the lever is held from further movement, the stop 35 being so positioned as to stop the lever just past the dead center position (see Fig. 4) so that the action of the spring 24 on the piston 22 will hold the lever in release position against the stop 35 positively, but with a force which is easily overcome by a slight pressure on the lever 13, at which time the lever will again slip past the dead center position and move to the set position shown in Fig. 1. The above arrangement makes possible the use of a resilient means to hold the mechanism in engagement until a definite torque is exceeded, after which the same resilient means holds the mechanism out of engagement until manually reset. Furthermore, because of the fact that the roller is only slightly past the dead center position when the mechanism is released and much farther past dead center in the opposite direction when at the load transmitting position, there is a more positive tendency to hold the lever in load transmitting position than in release position. These conditions are evident on comparison of Figs. 4 and 1.

As previously mentioned, it is to be noted, on reference to Fig. 5, that the socket 30 is formed with a portion 32 of arcuate cross section with its center of curvature substantially in line with the outer circumference of the spider. It is also important to note, however, that the arcuate portion 32 terminates inside the circumferential line of the spider, and the walls of the socket 30 continued at each edge in straight end walls tangent to the arcuate portion 32 as shown at 33 and 34 in Fig. 5. These end walls 33 and 34 are substantially parallel to radial lines drawn from the center of rotation of the spider through the line of tangency with the arcuate portion 32. It has been found that the inclination of the tangential end walls 33 and 34, in amount at or near parallelism with the radial lines from the center of rotation of the spider as above described, gives very satisfactory results in that the roller is definitely held in position in the spider, but is still so positioned as to tend to roll on the tangential flat surface of the end wall of the socket and to spring out of the socket only when the predetermined torque is exceeded in amount sufficient to overcome the spring pressure.

Another feature to be noted is the compactness of the unit and the housing of the parts in such manner that there are no objectionable projecting members which might prove dangerous in operation. The above results are accomplished by inwardly projecting bosses cast on the housing 12 in which are drilled suitable holes 23 each retaining a piston 22, a spring 24 and an adjusting plug 25. By this construction all of the above members, as well as other moving parts of the release unit, are all mounted within the outer circumference of the housing 12 leaving the outer surface free from projections.

Although I have described my invention as applied to a particular unit selected for purposes of illustration, I do not desire to be limited to the specific details herein described but rather to the scope of the following claims.

I claim:

1. An overload release mechanism for connecting rotating driving and driven members and effecting release at a predetermined maximum torque comprising an extension on one of said rotating members having sockets formed in its outer surface, pivotally mounted levers secured to the other of said rotating members each having an end shaped to engage one of said sockets, a piston mounted for reciprocation and having a flat face tangential to the arc of movement of an opposite end of each of said levers at the dead center position of its contacting movement on the face of said piston, springs urging said pistons against the said ends of said levers whereby said spring urged pistons act both to hold said levers in engagement and out of engagement with said sockets depending upon which side of dead center position said levers are set.

2. In an overload release device for effecting a driving connection between two rotating elements and to release said connection at a predetermined load, a spider member mounted to rotate with one of said rotating elements having a socket of arcuate cross sectional shape formed in the periphery of said spider, with the center of the arc of said socket positioned substantially at the circumference of said spider, said arcuate socket terminating at each edge in a flat end wall with each flat end wall tangent to the arcuate shaped portion of said socket and inclined substantially parallel with a radial line drawn from the center of rotation of said spider through the line of tangency of said arcuate portion with said flat end wall, a roller member mounted on the other of said rotating elements and movable to fit into said socket, resilient means positioned to exert a force in a direction to hold said roller member in said socket, whereby a driving connection is effected between said rotating elements, the torque transmitted by said elements being dependent upon the pressure exerted by said resilient means to hold said roller in said socket.

3. In an overload release device for effecting a driving connection between two rotating elements and to release said connection at a predetermined load, a spider member mounted to rotate with one of said rotating elements having a socket of arcuate cross sectional shape formed in the periphery of said spider, said arcuate socket terminating at each edge in a flat end wall with each flat end wall tangent to the arcuate shaped portion of said socket and inclined substantially parallel with a radial line drawn from the center of rotation of said spider through the line of tangency of said arcuate portion with said flat end wall, a roller member mounted on the other of said rotating elements and movable to fit into said socket, resilient means positioned to exert a force in a direction to hold said roller member in said socket, whereby a driving connection is effected between said rotating elements, the torque transmitted by said elements being dependent upon the pressure exerted by said resilient means to hold said roller in said socket.

EUGENE E. LANDAHL.